United States Patent [19]

Huth

[11] 3,925,919

[45] Dec. 16, 1975

[54] BAITING DEVICE

[76] Inventor: Clinton C. Huth, P.O. Box 156, Wisdom Pack Station, West Yellowstone, Mont. 59758

[22] Filed: Apr. 16, 1973

[21] Appl. No.: 351,147

[52] U.S. Cl. ................................................... 43/4
[51] Int. Cl.² ................................................ A01K 31/06
[58] Field of Search ............... 43/4, 18 R, 23, 42.08, 43/42.1, 44.4, 44.6, 44.8

[56] References Cited
UNITED STATES PATENTS

| | | | |
|---|---|---|---|
| 813,492 | 2/1906 | Fischer | 43/18 R |
| 891,573 | 6/1908 | Sulzer | 43/42.1 |
| 2,423,899 | 7/1947 | Odgard | 43/4 |
| 2,885,814 | 5/1959 | Schlador | 43/4 |
| 2,948,979 | 8/1960 | Kulp | 43/4 |

Primary Examiner—G. E. McNeill
Attorney, Agent, or Firm—Criddle & Thorpe

[57] ABSTRACT

A device for installing one or a plurality of fish hooks and part of the leader connected thereto within the body of a real or artificial worm, insect, small fish or other water life.

3 Claims, 8 Drawing Figures

BAITING DEVICE

BRIEF DESCRIPTION OF THE INVENTION

1. Field of the Invention

This invention relates to devices useful for aiding a fisherman to install a single item of bait on one or more hooks.

2. Prior Art

It can, I believe, be reasonably assumed that for a game fish to reach trophy size and weight, he, of necessity, acquires through experience certain abilities to recognize an item of bait, such as a worm, punctured repeatedly by a hook laced therethrough. To entice such a wiley fish it is therefore desirable to so disguise a hook within the bait that even the most cautious will be fooled.

In an effort to provide such a baited hook, devices such as those shown in U.S. Pat. Nos. 2,423,899, 2,948,979, 3,193,962, and 3,271,890 have been proposed. U.S. Pat. No. 3,217,890, unlike the present invention, involves arranging a worm as a shroud around a hook and part of the leader connected thereto, and so does not in any way anticipate the present invention; and the device of U.S. Pat. No. 3,193,962 is useful only for threading a leader through an item of bait. U.S. Pat. Nos. 2,423,899 and 2,948,979, while involving apparatus for installing a hook and connected leader within a worm, or like item of bait, are structurally and operationally unlike the device of the present invention.

The device of U.S. Pat. No. 2,423,899 involves a needle sharpened to a point on one end with a recess formed in the other for receiving the barbed end of a fish hook therein. A fish hook is implanted within an item of bait by impaling the bait on the needle pointed end, forcing the needle with the hook in the end thereof through the bait, leaving the hook therein. Likewise, the baiting device of U.S. Pat. No. 2,948,979 involves impaling a worm on a needle whereafter the pointed end of a fish hook is lodged in a recess in the needle end, above the impaled worm. The worm is then slid off the needle and over the hook and leader connected thereto.

Each of the above patented devices, of course, involves forcing a needle entirely through the bait to insert a hook therein. The device of the present invention, by releasibly attaching the bent portion of a fish hook across a rod portion thereof, allows the rod carrying the fish hook thereon to be inserted into the bait and then withdrawn through the same single puncture, leaving the hook implanted therein. This baiting technique results in minimal mutilation of the item of bait, insuring that the bait will retain a life-like appearance and, I believe, is a more simple and reliable technique than is possible using the needle devices of the aforesaid patents. Further, the rod of the present invention preferably employs a rounded rather than pointed tip, curtailing an unwanted puncture of the body of the bait or the fisherman's hand. Additionally, unlike the needles of the aforesaid patents, the rod portion of the present invention includes at least one notch formed thereacross, intermediate its length, which notch is slanted so as to releasibly maintain a fish hook therein while the rod is inserted into an item of bait.

SUMMARY OF THE INVENTION

It is a principal object of the present invention to provide a baiting device capable of implanting at least one fish hook and connected leader within an item of bait.

Another object is to provide a baiting device useful for implanting at least one fish hook within an item of bait while making only a single hole in the bait and minimizing mutilation of the bait.

Another object is to provide a baiting device useful for simultaneously installing a number of spaced hooks within an item of bait.

Still another object is to provide an inexpensive baiting device constructed from readily available materials and one that even a novice fisherman can safely use to place a hook within an item of bait.

Still another object is to provide a method for implanting a fish hook within an item of bait using a baiting device like that of the present invention.

Principal features of the present invention include a straight rod having one end thereof formed into a rounded point. The opposite end of the rod has a handle thereon. The handle is preferably formed of cork or like material with a somewhat roughened surface against which a fisherman can use his thumb to tightly hold a section of leader. The rod has at least one notched-out portion formed thereacross, which notched-out portion is slanted towards the handle such that when the curved portion of a fish hook is installed therein, and the hook eyelet end is pulled appropriately by applying a tensile force to the fish hook leader, the fish hook will be urged into the notch.

A fish hook tied to the end of a leader is coupled to the baiting device of the present invention by installing the hook curved portion within the notched-out portion of the rod such that the hook barbed end points back towards the handle. The leader connected to the hook eyelet is then pulled towards the handle, urging the hook to seat in the notch, and the taut leader is held against the handle, as by a fisherman placing his thumb thereover. With the fish hook so installed, the rod blunted point end is forced through the skin of an item of bait, preferably through one end thereof, passing the rod and seated hook into the body of the bait. Prior to the rod blunted point end emerging from the opposite side or end of the body of the bait, the fisherman releases the leader, and withdraws the rod from the bait leaving the hook therein. Whereafter, the fisherman, depending on his personal preferences, by manipulating the hook within the bait, can force the barbed end thereof through the side of the bait or can leave the hook entirely enrobed within the bait.

Additional objects and features of the invention will become apparent from the following detailed description, taken together with the accompanying drawings.

THE DRAWINGS

FIG. 1 is a side elevation of one embodiment of the baiting device of the present invention with a fish hook and leader aligned thereabove;

FIG. 2, a side elevation view of a second embodiment of the baiting device of the present invention with three fish hooks serially linked by a leader aligned thereabove;

FIGS. 3 through 8, side elevation views of the baiting device of FIG. 1 with the fish hook and leader arranged therewith showing the steps involved in implanting the fish hook within a worm.

DETAILED DESCRIPTION

Figure 1:
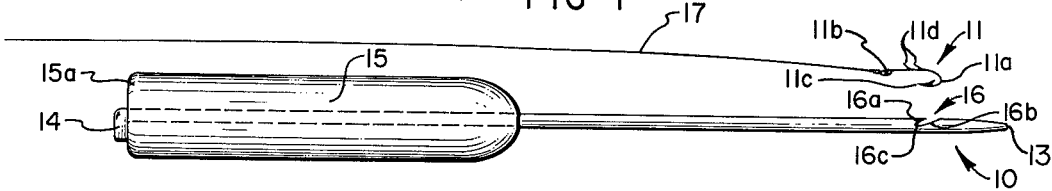

Referring now to the drawings:

FIG. 1 shows a first embodiment of a baiting device 10 of the present invention that is capable of installing a single fish hook 11 within an item of bait, such as a worm 18 shown in FIGS. 3 through 8. The baiting device 10, shown in FIG. 1, consists of a straight rod 12 having a rounded point 13 formed on one end thereof. The opposite rod end 14 is fitted through a handle 15 which is preferably formed of cork or a like material, and is secured to the end 15a thereof such that the rod 12 is maintained within the handle 15. A notched-out portion 16, hereinafter referred to as notch, and is formed on a bias at an intermediate point in the rod 12 is shown as a "V", having one essentially straight leg 16a and a curved leg 16b, which legs intersect at 16c. The notch straight leg 16a is inclined on a diagonal with respect to the rod 12 surface, such that the intersection 16c of the notch legs is closer to the handle 15 than is the opposite end of the essentially straight leg 16a. So configured, by installing the curved portion 11a of the fish hook 11 within the notch 16 and pulling taut a leader 17 attached to the hook eyelet 11b, the hook curved portion 11a will be drawn into notch 16 along the essentially straight leg 16a until the hook curved portion is seated in the notch intersection 16c. The taut leader can then be held to the handle 15 as by a fisherman, not shown, placing his thumb thereover. In this attitude, end 11c and body barbs 11d of the hook 11 point towards the handle 15 and are aligned to pass freely into an item of bait when the rod rounded end 12 is so inserted. Such an insertion of the hook 11 into a worm 18 will be described in detail later herein with respect to FIGS. 3 through 8.

Figure 2:
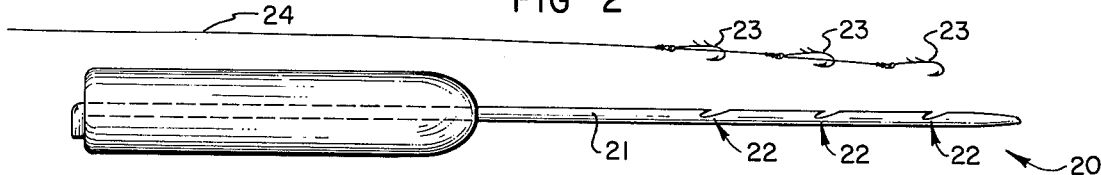

FIG. 2 shows a second embodiment of a baiting device 20 that is essentially like the baiting device 10 of the first embodiment with the exception that instead of having one notch 16 formed in the rod 12, the rod 21 of the baiting device 20 has three spaced notches 22 formed therein. The individual spaced notches 22 are individually identical to the described notch 16 and are intended to receive fish hooks 23 that are serially connected to a single leader 24. The fish hooks 23, like the fish hook 11, are each installed in a notch 22, whereafter the single leader 24 is drawn taut and is maintained against a handle 25, as has been described with respect to FIG. 1, to seat the fish hooks 23 therein.

While three notches 22 have been shown formed in the rod 21 of the baiting device 20, it should be obvious that more or less than three notches could as easily be formed therein, without departing from the invention disclosed herein. The baiting device of the present invention can, therefore, have any desired number of notches formed therein to accommodate a like number of fish hooks serially connected and appropriately spaced apart to correspond to the notch spacing.

Figure 3:
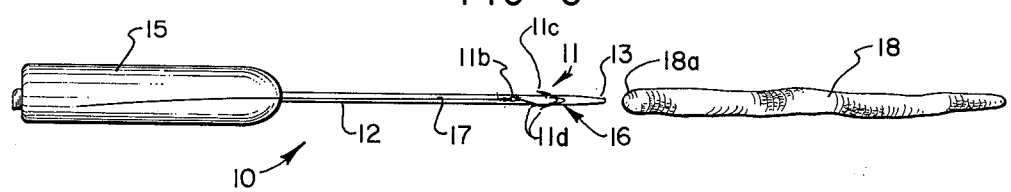

FIGS. 3 through 8, as already mentioned herein, illustrate the sequence of steps involved in installing the worm 18 over the hook 11 and part of the connected leader 17, using the baiting device 10. FIG. 3 shows the one end 18a of the worm 18 aligned with the rounded point 13 formed on the end of the rod 12. The rod 12 is shown as having the fish hook 11 installed thereon, as has been explained.

Figure 4:
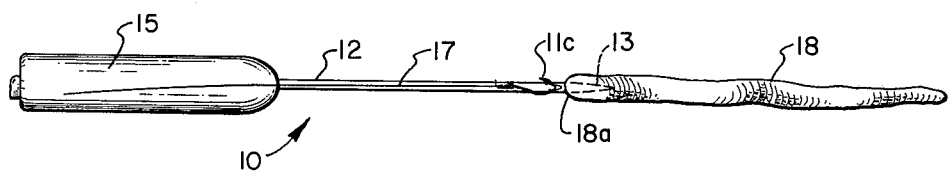

In FIG. 4, the rounded point 13 has punctured and has traveled to within the worm end 18a such that the worm end butts against the curved portion 11a or the hook 11.

Figure 5:
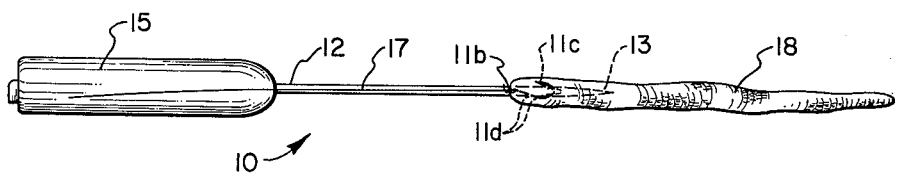

The worm end 18a in FIG. 5 has been pushed over the hook curved portion 11a, over the respective hook curved portion 11a, over end and body barbs 11c and 11d, and over the hook eyelet 11b.

Figure 6:
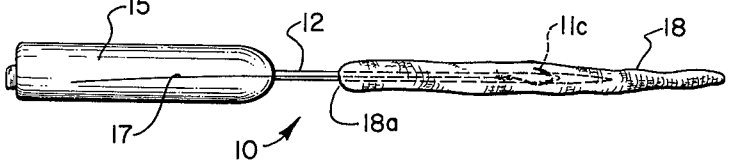
Figure 7:
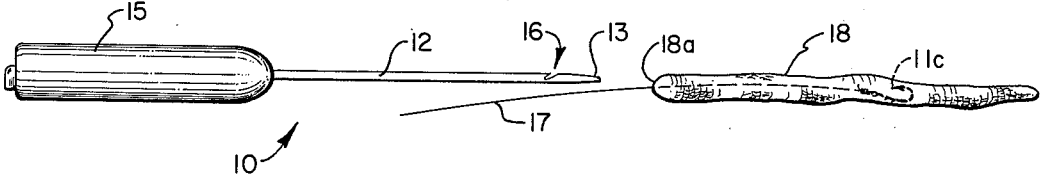

In FIG. 6, the baiting device rod 12 has been slid well into the worm 18, arriving at a desired location whereat the fisherman, not shown, desires the hook 11 to be positioned. In this attitude, tension on the leader 17 is relaxed, as by the fisherman, not shown, removing his thumb off from the leader maintained against the handle 15. Thereafter, the rod 12 is pulled from the worm 18 out through the puncture in the worm end 18a. As the rod 12 is withdrawn from the worm 18, the fish hook 11 is cammed by its respective end and body barbs 11c and 11d, lodging in the worm interior out of the notch 16, leaving the hook 11 within the worm 18 as shown in FIG. 7.

Figure 8:
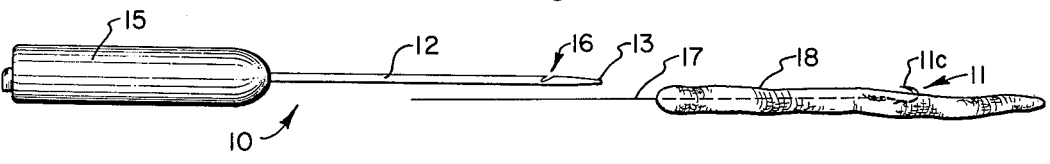

FIG. 8 shows the hook barb end 11c having been pushed through the side of the worm 18, as by a fisherman, not shown, pushing the opposite worm side against the hook curved portion 11a until the hook barb end 11c passes through the worm side. It should, of course, be understood that the hook 11 could be left, as shown in FIG. 7, completely enrobed by the worm 18.

While only the insertion of a single hook 11 into the worm 18 has been shown herein, it should be obvious that, by using the baiting device 20 or a like baiting device, more than one hook could be simultaneously installed within the worm 18.

Although the baiting device of the present invention has been shown herein installing only a single fish hook in a worm, it should be obvious that the device as disclosed could be used to install a single or a number of fish hooks into an insect, such as a beetle, into a small fish or into a like item of bait.

Although preferred forms of my invention have been herein disclosed, it is to be understood that the present disclosure is made by way of example, and that variations are possible without departing from the subject matter coming within the scope of the following Claims, which subject matter I regard as my invention.

I claim:

1. A method for installing an item of bait onto a fish hook attached to a fishing line using a baiting device having a hand engaging portion and a straight rod portion extending therefrom, which straight rod portion has a notch formed on a bias therein, which notch slants towards said hand engaging portion comprising the steps of installing a curved portion of the fish hook within the notch formed in the baiting device rod;

pulling taut the fishing line against an eyelet end of said fish hook to seat the fish hook curved portion within the notch;

securing the fishing line in a taut state against the baiting device handle portion;

inserting the end of the baiting device rod opposite to the handle portion thereof into the body of an item of bait;

inserting the baiting device rod into said item of bait, while passing the fish hook arranged in the notch in the baiting device rod into said body of said item of bait;

releasing the tension on the fishing line; and separating the baiting device rod from the body of the item of bait through the opening formed by insertion of the rod thereinto while leaving each hook positioned therein in place.

2. A method for installing an item of bait onto a hook as recited in claim 1, further including the step of
forcing a barbed end of at least one of the fish hooks positioned within the body of the item of bait out through a side of said body.

3. A device for baiting a hook attached to a fishing line comprising an elongate rod having one end arranged to receive an item of bait impaled thereon;

a handle secured to the end of said rod opposite to said bait impaling end; and at least one notch means formed across said rod extending on a bias into said rod such that an intersection of sides thereof, within said rod, is the closest point of said notch means to said handle, said notch forming a slanted "V" with the intersection of the sides thereof being the part of the notch that is closest to the handle and with the notch being large enough to secure a fish hook therein.

* * * * *